(12) United States Patent
     Yu

(10) Patent No.: US 9,826,023 B2
(45) Date of Patent: *Nov. 21, 2017

(54) MANAGING TRANSMISSION AND STORAGE OF SENSITIVE DATA

(71) Applicant: Fortinet Inc., Sunnyvale, CA (US)

(72) Inventor: Qianyong Yu, Burnaby (CA)

(73) Assignee: Fortinet, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/237,055

(22) Filed: Aug. 15, 2016

(65) Prior Publication Data

US 2016/0352719 A1    Dec. 1, 2016

Related U.S. Application Data

(63) Continuation of application No. 14/612,594, filed on Feb. 3, 2015, now Pat. No. 9,584,587.

(51) Int. Cl.
*H04L 29/06* (2006.01)
*H04L 29/08* (2006.01)
(Continued)

(52) U.S. Cl.
CPC .............. *H04L 67/06* (2013.01); *G06F 21/45* (2013.01); *G06F 21/6263* (2013.01);
(Continued)

(58) Field of Classification Search
CPC ......... H04L 63/04; H04L 63/08; H04L 63/10; H04L 63/20; H04L 63/30; H04L 63/0227;
(Continued)

(56) References Cited

U.S. PATENT DOCUMENTS 6,564,320 B1    5/2003  de Silva et al.
7,069,437 B2 *  6/2006  Williams ............ H04L 63/0272
                                                      713/150

(Continued)

OTHER PUBLICATIONS

Non-Final Rejection for U.S. Appl. No. 141612,594 dated Jul. 19, 2016.

(Continued)

*Primary Examiner* — Hosuk Song
(74) *Attorney, Agent, or Firm* — Hamilton, DeSanctis & Cha LLP

(57) ABSTRACT

Systems and methods for injecting sensitive data into outgoing traffic on behalf of a user of a private network are provided. According to one embodiment, a network security appliance maintains a database of sensitive data. Secure submission of sensitive data of a user is facilitated by the security appliance in connection with interactions between a client and a server by: (i) intercepting outgoing traffic from the client to the server; (ii) determining whether the outgoing traffic matches a policy configured by an administrator of the private network that causes the sensitive data to be injected into the outgoing traffic by the network security device on behalf of the user; and (iii) when the determining is affirmative: (a) retrieving the sensitive data from the database; (b) modifying the outgoing traffic by injecting the sensitive data into the outgoing traffic; and (c) sending the modified outgoing traffic to the server.

20 Claims, 9 Drawing Sheets

(51) Int. Cl.
*G06F 21/45* (2013.01)
*G06F 21/62* (2013.01)
*G06Q 50/26* (2012.01)

(52) U.S. Cl.
CPC .......... *H04L 63/0236* (2013.01); *H04L 63/08* (2013.01); *H04L 63/1475* (2013.01); *H04L 63/18* (2013.01); *H04L 67/02* (2013.01); *G06F 2221/2115* (2013.01); *G06Q 50/265* (2013.01); *H04L 2463/102* (2013.01)

(58) Field of Classification Search
CPC . H04L 67/06; H04L 63/0236; H04L 63/1475; H04L 63/18; G06F 21/31; G06F 21/335; G06F 21/45; G06F 21/6263
USPC .......... 726/1–7, 10–14, 27–30; 713/150–153
See application file for complete search history.

(56) References Cited

U.S. PATENT DOCUMENTS

| | | | |
|---|---|---|---|
| 7,266,681 B1* | 9/2007 | Janes | ................ H04L 63/20 713/150 |
| 7,441,262 B2 | 10/2008 | Hui et al. | |
| 7,536,715 B2* | 5/2009 | Markham | ........... H04L 63/0218 370/351 |
| 7,565,690 B2* | 7/2009 | Doherty | ................ G06F 21/554 713/150 |
| 7,978,714 B2 | 7/2011 | Rao et al. | |
| 8,091,131 B2* | 1/2012 | Krishnamurthy | ... H04L 63/1416 370/254 |
| 8,171,535 B2 | 5/2012 | Rubio et al. | |
| 8,312,308 B2* | 11/2012 | Kanekar | ............. H04L 63/0823 713/150 |
| 8,683,566 B1 | 3/2014 | Gailloux et al. | |
| 8,914,406 B1* | 12/2014 | Haugsnes | ........... H04L 63/1441 382/305 |
| 9,584,587 B2 | 2/2017 | Yu | |
| 2016/0224801 A1 | 8/2016 | Yu | |

OTHER PUBLICATIONS

Notice of Allowance for U.S. Appl. No. 14/612,594 dated Dec. 5, 2016.

* cited by examiner

MANAGING TRANSMISSION AND STORAGE OF SENSITIVE DATA

CROSS-REFERENCE TO RELATED PATENTS

This application is a continuation of U.S. patent application Ser. No. 14/612,594, filed on Feb. 3, 2015, now U.S. Pat. No. 9,584,587, which is hereby incorporated by reference in its entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2015-2016, Fortinet, Inc.

BACKGROUND

Field

Embodiments of the present invention generally relate to the field of computer networking. In particular, various embodiments relate to systems and methods for managing transmission and storage of sensitive data.

Description of the Related Art

When users use online services, such as online shopping, online storage, social media, and the like, a large amount of sensitive data may be transmitted from local clients to remote servers through computer networks, such as the Internet. The sensitive data may include usernames/passwords for websites and other online services, virtual private network (VPN) credentials, social security numbers (SSNs), credit/debit card information and other personal information. Typically, the sensitive data is either stored in a local secure storage and is provided by the operating system (OS) or web browser, or is input (e.g., via a keyboard) by the user directly at a local computer and then transmitted from the local computer to a remote server.

The fact that sensitive data must be present on the local computer each and every time it is submitted to a remote server creates security risks. For example, if the local computer is compromised with malware, an attacker may obtain complete access to sensitive data stored or typed in the local computer. This is typically achieved in several ways including one or more of the following:

a. Retrieving it directly from the local storage;
    b. Installing a key logger to collect user input; and
    c. Injecting code into the browser to parse and extract data from web forms.

The local computer used to access online services is typically a conventional personal computer, laptop or mobile computing device (e.g., a tablet computer or smartphone)—all of which are relatively vulnerable to attacks as compared to network security devices that are designed to provide protection to such endpoint devices.

While password management software has been developed to manage usernames/passwords that are to be inputted by a user, such software does not provide a complete solution to the problem. After password management software is installed on a local computer, it may manage and store usernames/passwords for various websites, applications, services and the like that are used by the user locally or remotely. When the user accesses a login page of a web site, for example, the corresponding username/password of the web site is retrieved by the password management software and may be automatically filled into the login form and submitted to the website. As it is recommended that users employ different usernames and passwords for each password protected account and "strong" passwords are often difficult to remember, typically including over eight characters, comprising symbols, numbers and a combination of capitalized and non-capitalized letters, password management software promotes good practices and facilitates management of many usernames and strong passwords. Existing password management software may also provide some protections to the usernames/passwords by encryption and/or remote storage; however, sensitive data (e.g., the usernames and passwords) remains vulnerable to attack by key loggers and/or injected code as the sensitive data is present at the users' computers prior to being submitted to a password-protected website, for example.

Therefore, there is a need for a method and system that addresses these vulnerabilities.

SUMMARY

Systems and methods are described for injecting sensitive data into outgoing traffic that is to be sent to a remote server from a client by a network security appliance logically interposed between the server and the client. According to one embodiment, a network security appliance logically interposed between local clients associated with a private network protected by the network security appliance and remote servers residing outside of the private network maintains a database of sensitive data of users of the private network. Secure submission of sensitive data of a user is facilitated by the network security appliance in connection with interactions between a local client and a remote server by: (i) intercepting outgoing traffic from the local client to the remote server; (ii) determining whether the outgoing traffic matches a policy configured by an administrator of the private network that causes the network security appliance to inject the sensitive data into the outgoing traffic on behalf of the user; and (iii) when the determining is affirmative: (a) retrieving the sensitive data from the database; (b) modifying the outgoing traffic by injecting the sensitive data into the outgoing traffic to form modified outgoing traffic; and (c) sending the modified outgoing traffic to the remote server.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1:
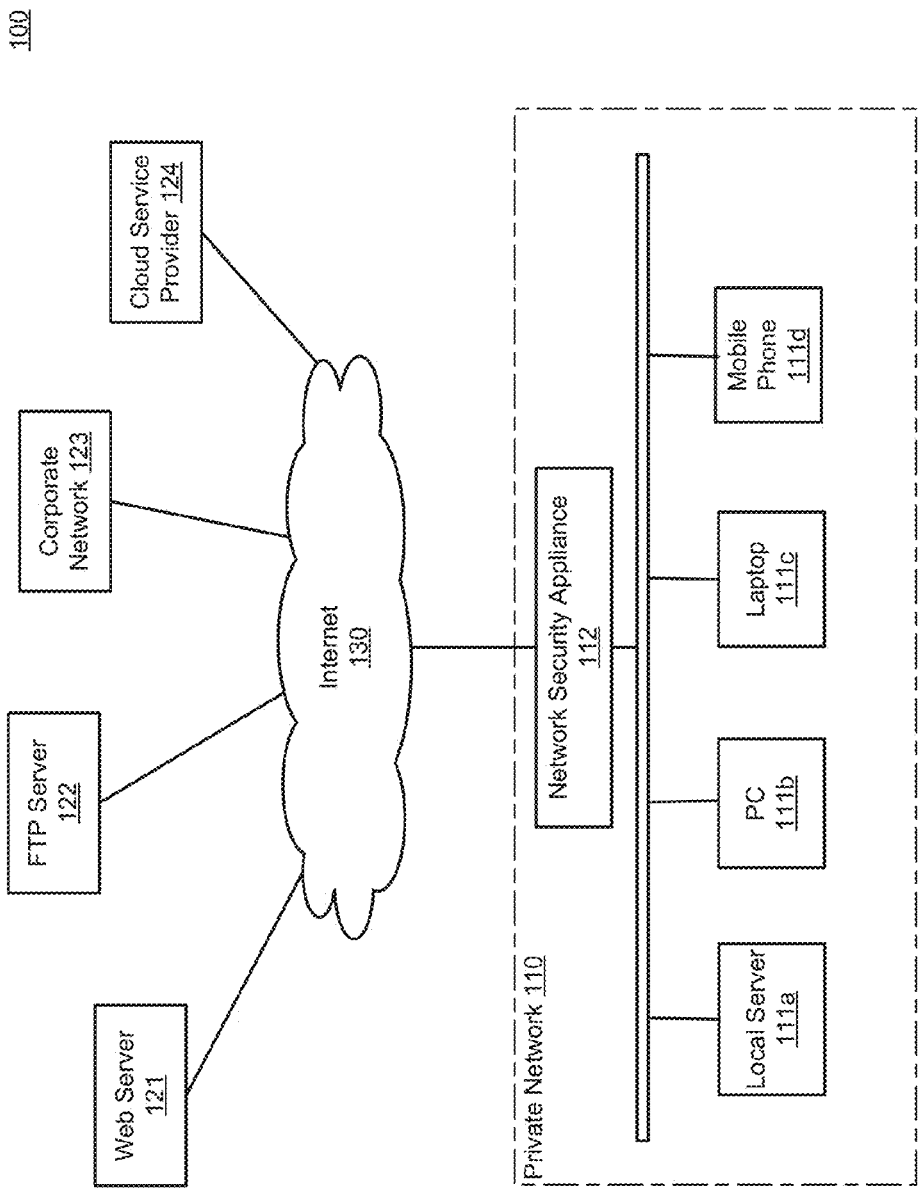
FIG. 1 illustrates an exemplary network architecture in accordance with an embodiment of the present invention.

Systems and methods are described for injecting sensitive data into outgoing traffic that is to be sent to a remote server from a client by a network security appliance located between the server and the client. In embodiments of the present invention, sensitive data is stored at the network security appliance and is not stored, input or present at a user's device. Malware on the user's device cannot access sensitive data entered prior to the infection. Although sensitive data is injected in the middle of the transmission of the traffic to the remote server, it does not change the client/server interaction. The injection of sensitive data is entirely transparent to the remote server. In one embodiment, the method includes intercepting, by a network security appliance, outgoing traffic from a client to a server, wherein the network security appliance locates between the client and the server. The network security appliance identifies a submission command from the outgoing traffic, wherein the submission command is used for submitting sensitive data of a user to the server without sensitive data of the user actually incorporated in the submission command when the user submitted the command at the client. The network security appliance retrieves the sensitive data of the user that is stored at the network security appliance and modifies the outgoing traffic by injecting the sensitive data of the user into the submission command to form modified outgoing traffic. The network security appliance transmits the modified outgoing traffic to the server.

In the following description, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present invention may also be downloaded as one or more computer program products, wherein the program may be transferred from a remote computer to a requesting computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the machine-readable storage medium or by copying the code from the machine-readable storage medium into another machine-readable storage medium (e.g., a hard disk, RAM, etc.) or by transmitting the code on a network for remote execution. Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Notably, while embodiments of the present invention may be described using modular programming terminology, the code implementing various embodiments of the present invention is not so limited. For example, the code may reflect other programming paradigms and/or styles, including, but not limited to object-oriented programming (OOP), agent oriented programming, aspect-oriented programming, attribute-oriented programming (@OP), automatic programming, dataflow programming, declarative programming, functional programming, event-driven programming, feature oriented programming, imperative programming, semantic-oriented programming, functional programming, genetic programming, logic programming, pattern matching programming and the like.

Terminology

Brief definitions of terms used throughout this application are given below.

The term "client" generally refers to an application, program, process or device in a client/server relationship that requests information or services from another program, process or device (a server) on a network. Importantly, the terms "client" and "server" are relative since an application may be a client to one application but a server to another. The term "client" also encompasses software that makes the connection between a requesting application, program, process or device to a server possible, such as an FTP client.

The term "server" generally refers to an application, program, process or device in a client/server relationship that responds to requests for information or services by another program, process or device (a server) on a network. The term "server" also encompasses software that makes the act of serving information or providing services possible.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in one embodiment," "according to one embodiment," "and the like" generally mean the particular feature, structure, or characteristic following the phrase is included in at least one embodiment of the present invention, and may be included in more than one embodiment of the present invention. Importantly, such phrases do not necessarily refer to the same embodiment.

The phrase "network security appliance" generally refers to a specialized or dedicated device for use on a network in virtual or physical form that is intended to protect a network from propagating unwanted traffic or leaking sensitive data, for example. Some network security appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network security appliance include, but are not limited to, Layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network security appliances include, but are not limited to, active devices that block unwanted traffic, including, but not limited to, firewalls, antivirus scanning devices and content filtering devices, passive devices that detect and report on unwanted traffic, including, but not limited to intrusion detection appliances, prevention devices that scan networks and identify potential security problems, including, but not limited to penetration testing and vulnerability assessment appliances and Unified Threat Management (UTM) appliances that combine features together into one system, including, firewalls, content filtering, web caching and the like. Specific examples of network appliances and network security appliances provided by the assignee include, but are not limited to network gateways (e.g., the FORTIGATE family of network security appliances and the FORTICARRIER family of consolidated security appliances), messaging security appliances (e.g., the FORTIMAIL family of messaging security appliances), database security and/or compliance appliances (e.g., the FORTIDB database security and compliance appliance), web application firewall appliances (e.g., the FORTIWEB family of web application firewall appliances), application acceleration appliances, server load balancing appliances (e.g., the FORTIBALANCER family of application delivery controllers), vulnerability management appliances (e.g., the FORTISCAN family of vulnerability management appliances), configuration, provisioning, update and/or management appliances (e.g., the FORTIMANAGER family of management appliances), logging, analyzing and/or reporting appliances (e.g., the FORTIANALYZER family of network security reporting appliances), bypass appliances (e.g., the FORTIBRIDGE family of bypass appliances), Domain Name Server (DNS) appliances (e.g., the FORTIDNS family of DNS appliances), wireless security appliances (e.g., the FORTIWIFI family of wireless security gateways), distributed denial of service (DDoS) protection appliances (e.g., the FORTIDDOS family of DDoS prevention appliances), wireless access point appliances (e.g., the FORTIAP wireless access points), switches (e.g., the FORTISWITCH family of switches) and IP-PBX phone system appliances (e.g., the FORTIVOICE family of IP-PBX phone systems).

If the specification states a component or feature "may", "can", "could", or "might" be included or have a characteristic, that particular component or feature is not required to be included or have the characteristic.

FIG. 1 illustrates an exemplary network architecture 100 in accordance with an embodiment of the present invention. In the context of the present example, network architecture 100 comprises a private network 110, a web server 121, an FTP server 122, a corporate network 123, a cloud service provider 124. Private network 110, web server 121, FTP server 122, corporate network 123 and cloud service provider 124 are accessible to end users through internetworks, such as the Internet 130. Private network 110 includes multiple network appliances, such as a local server 111a, a PC 111b, a laptop 111c, a mobile phone 111d and other computing devices that are operatively coupled to each other through a Local Area Network (LAN), wherein the LAN is then operatively coupled with a network security appliance 112 that enables access to Internet 130. Network security appliance 112 separates the external computing environment, represented by Internet 130, from the internal computing environment of private network 110. Network security appliance 112 may intercept communications between Internet 130 and the network appliances of private network 110 and scan for malware, viruses or other high risk network accesses.

In one embodiment, network security appliance 112 may be in the form of a rule-based network security device that controls traffic going through its interfaces. In an exemplary embodiment of the present invention, network security appliance 112 may be a FORTIGATE gateway available from Fortinet, Inc. of Sunnyvale, Calif. (FORTIGATE is a trademark or registered trademark of Fortinet, Inc.). Usually, network security appliance 112 includes multiple physical network interfaces, such as an internal interface with 4-24 or more Ethernet ports, 1-4 or more wide area network (WAN) interfaces and one demilitarized zone (DMZ) interface. Further, when private network 110 is separated into multiple virtual LANs (VLANs), network security appliance 112 may also define multiple virtual interfaces for each of the VLANs.

According to one embodiment, network security appliance 112 includes a rule set with multiple rules created by a network administrator and uses the rule set to control traffic going through network security appliance 112. In the context of each rule, traffic is typically identified by source interfaces, destination interfaces, source Internet Protocol (IP) addresses, destination IP addresses, users/user groups, devices and/or other parameters of the traffic. In operation, all traffic going through interfaces of network security appliance 112 is captured by network security appliance 112. The source interface, destination interface and other parameters of the captured traffic flow are matched with those of each rule of the rule set. The first matched rule in the rule set is typically used for controlling the traffic flow and the traffic flow is processed based on the action defined in the matched rule.

Network security appliance 112 may also intercept outgoing traffic that is transmitted from a client within private network 110 to a remote server. Network security appliance 112 may identify a command (e.g., a RESTful application programming interface (API) call) or a form (e.g., a HyperText Transfer Protocol (HTTP) form submitted via a POST request method) contained in the outgoing traffic that is used to submit sensitive information of a user to the remote server. In embodiments of the present invention, a command sent from a client (e.g., a user's PC, laptop, tablet or smartphone) that is typically used for submitting sensitive data to a remote server will contain no sensitive data. Rather, sensitive data of the user is stored within an network security appliance (e.g., network security appliance 112) that is logically interposed between the client and the remote server. As such, the sensitive data may be retrieved on an as-needed based by network security appliance 112 and injected into the command or form to modify the outgoing traffic sent by the client. The modified outgoing traffic (which now contains the necessary sensitive information of the user) can then be transmitted to the remote server so that the sensitive data of the user may be submitted to the server without inputting it, presenting it or otherwise storing it on the (potentially compromised) client.

In another embodiment of the present invention, network security appliance 112 may also intercept incoming traffic that is transmitted from a remote server to a client within private network 110. Network security appliance 112 may identify a command or a form contained in the incoming traffic that is to be used to submit sensitive information of a user to the server. Responsive thereto, network security appliance 112 may modify the incoming traffic by, for example, injecting a local command, removing a command or otherwise altering the form to generate a modified version of the incoming traffic. In one embodiment, the modified version of the incoming traffic may remove prompts for sensitive information (e.g., username/password) so they are not presented to the user. In one embodiment, the injected local command or altered form may further facilitate receipt of the user's login credentials so as to permit access to sensitive information of the user that is stored by network security appliance 112. The modified incoming traffic may then be transmitted to the client. The user of the client may input credential information of the user into the injected local command or form and submit the credential information to network security appliance 112 in outgoing traffic transmitted the remote server. Network security appliance 112 may identify the user based on the credential information and retrieve sensitive data corresponding to the user and the remote server. The sensitive data may then be injected to the outgoing traffic and transmitted to the remote server.

Figure 2:
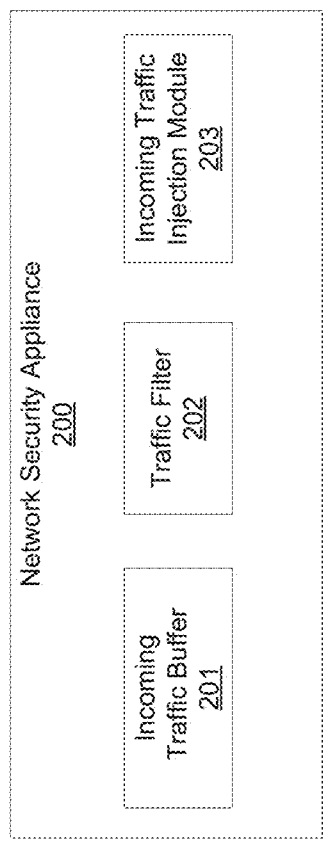
FIG. 2 illustrates exemplary incoming traffic processing units of a network security appliance in accordance with an embodiment of the present invention.

FIG. 2 illustrates exemplary incoming traffic processing units of a network security appliance 200 in accordance with an embodiment of the present invention. In the present embodiment, network security appliance 200 may intercept incoming traffic transmitted from a remote server to a client within a private network and inject one or more local commands or forms into the incoming traffic so that a user may submit his/her network security appliance access credentials to the network security appliance when the user submits information to the remote server. It should be noted that injecting local commends and/or local forms into the incoming traffic to identify the user is optional. In some embodiments, the user of the traffic can be identified based on parameters that may be extracted from the traffic, such as the destination IP address, the destination port number, protocol of the traffic and the like.

In the present embodiment, network security appliance 200 includes an incoming traffic buffer 201, a traffic filter 202 and an incoming traffic injection module 203. Incoming traffic buffer 201 is used for intercepting and storing incoming traffic that is transmitted from a remote server to a client within a private network. If the incoming traffic between the remote server and the client is encrypted, network security appliance 200 may decrypt the incoming traffic to allow parsing, local filtering and/or injection.

Traffic filter 202 is used for filtering the incoming traffic based on policies set up by the network administrator. For example, the network administrator may set up a policy that traffic from banking and/or online shopping websites may be filtered for further analysis to detect a login form embedded in the traffic. In one embodiment, after traffic passes traffic filter 202, incoming traffic injection module 203 may extract a remote form, originated by the remote server and intended to prompt a user to submit sensitive data to the server, and injects a local command or form into or in place of the remote form to generate a modified remote form. The modified remote form is embedded into the incoming traffic, thereby generating modified incoming traffic. The modified incoming traffic may be encrypted, if desired, and transmitted to the client and the user may fill in information required by the remote server as well as local credentials or commands in the modified form. An example of the structure and operation of incoming traffic injection module 203 will be described further below with reference to FIG. 3.

Figure 3:
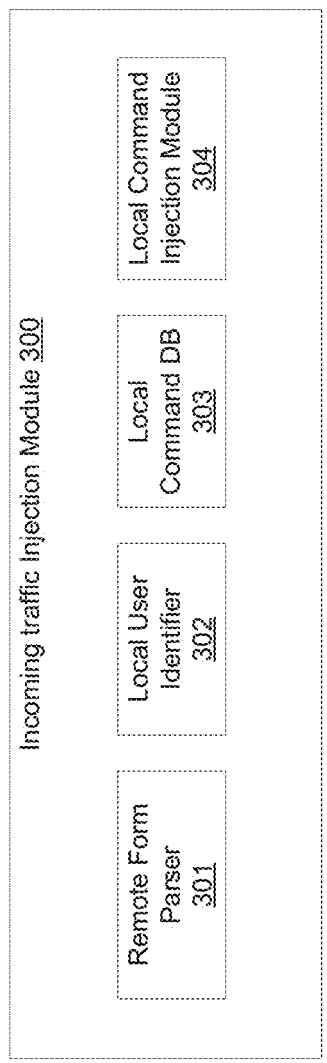
FIG. 3 illustrates exemplary processing units of an incoming traffic injection module in accordance with an embodiment of the present invention.

FIG. 3 illustrates exemplary processing units of an incoming traffic injection module 300 in accordance with an embodiment of the present invention. In the present embodiment, incoming traffic injection module 300 includes a remote form parser 301, a local user identifier 302, a local command DB 303 and a local command injection module 304.

Figure 4:
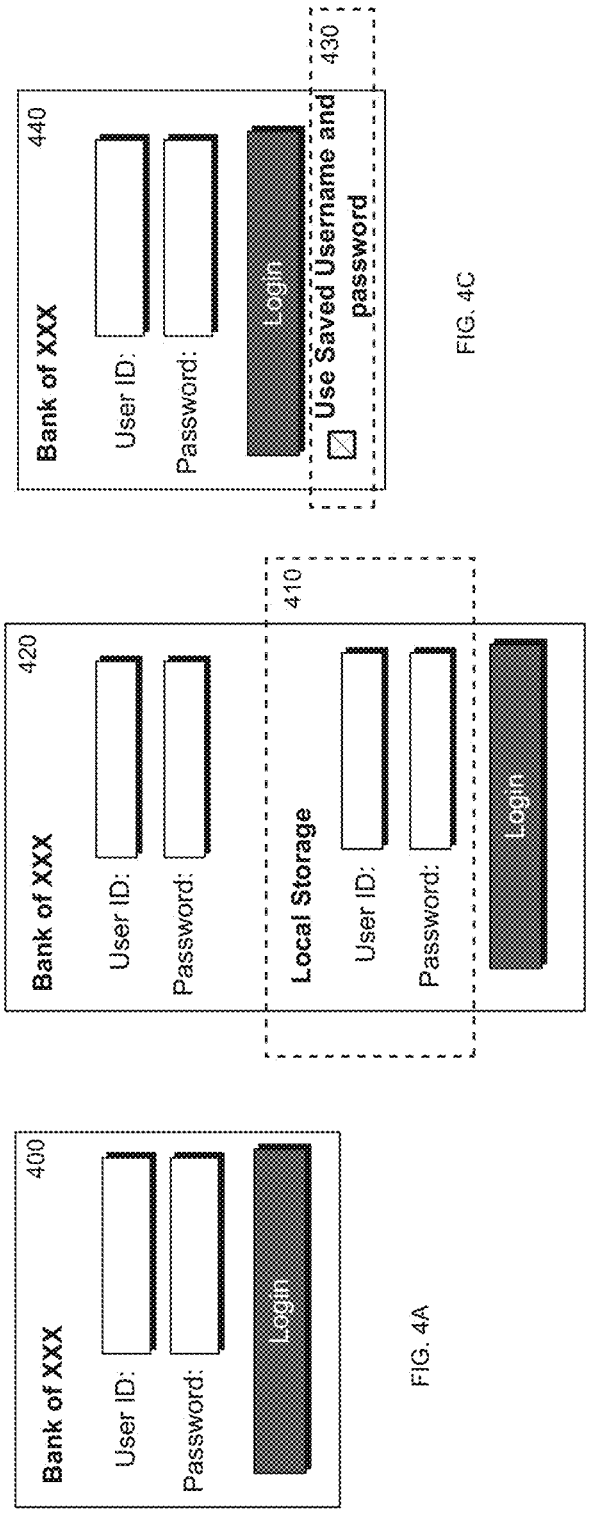
FIG. 4A illustrates a remote login form that is transmitted from a remote server to a client in accordance with an embodiment of the present invention.
FIG. 4B illustrates a modified remote login form in which local login fields are injected by a network security appliance in accordance with an embodiment of the present invention.
FIG. 4C illustrates a modified remote login form in which a local option is injected by a network security appliance in accordance with an embodiment of the present invention.

Remote form parser 301 is used for identifying a remote form embedded in the incoming traffic. Usually, the form embedded in the incoming traffic is a remote login form sent from the remote server to the client so that a user may submit his/her credentials, relating to an account maintained by the remote server, to the remote server. An example of a remote login form is shown in FIG. 4A. It will be apparent to those of ordinary skill in the art that a variety of other forms may be embedded in the incoming traffic. For example, a form that asks the user to submit other sensitive data, such as personal addresses, social security numbers (SSNs), telephone numbers or credit/debit card information may be transmitted from the remote server to the client. Although different websites have different login forms, login forms of well-known websites are fixed and source codes of the login forms of these websites are known to remote form parser 301. Remote form parser 301 may store source codes of the login forms of well-known websites in a table when the network security appliance is deployed at the private network. Exemplary source code used by well-known login forms of various websites are shown below in Table 1.

TABLE 1

| website | Source code of login form |
|---|---|
| Bank of America | \<form name="frmSignIn" action="https://secure.bankofamerica.com/login/sign-in/entry/signOn.go" method="post" autocomplete="OFF" class="form-inline" onsubmit="javascript:doPassmarkSignIn( ); return false;"> . . . |
| CitiBank | \<form AUTOCOMPLETE="off" name="SignonForm" method="POST" id="SignonForm" onsubmit="processUnload( );return doSubmit(this)" . . . > |
| Amazon | \<form name="signIn" method="POST" id="ap_signin_form" novalidate="novalidate" action="https://www.amazon.com/ap/signin" . . . |
| . . . | . . . |

When incoming traffic from a well-known website is intercepted, remote form parser 301 may compare the incoming traffic with stored source code representing known login forms and identify the incoming traffic as containing a login form if there is a match. Notably, a match might be configured to require a 100% match or a lower threshold. For example, the existence of defined and/or configurable number of keywords and/or commands may be a sufficient indicator that the input traffic includes a login form as described further below.

When no well-known login form is identified by way of an exact match, remote form parser 301 may analyze the incoming traffic on the fly and identify if a login form is embedded in the incoming traffic based on a keyword analysis. For example, remote form parser 301 may parse the incoming traffic and extract a form from the traffic. Then remote form parser 301 may check the names of the form and names of inputs of the form. If the form embedded in the incoming traffic is named "sign-in", "sign-on" or "login," for example, and the names of inputs of the form contain keywords, such as "User Name", "User ID" and/or "password," for example, remote form parser 301 may conclude that a login form is embedded in the incoming traffic.

Local user identifier 302 may further identify the local user that is bound with the incoming traffic. For example, when a local user logs into a private network that is controlled by the network security appliance, an IP address is bound with the user. As such, in one embodiment, local user identifier 302 may extract the destination IP address from the incoming traffic to identify the local user to whom the incoming traffic is intended.

Local command DB 303 is used for storing local forms that correspond to well-known remote login forms at network security appliance. As each of the well-known login forms may have different formats and appearances, in one embodiment, such formats and general appearances are maintained during any modifications made by incoming traffic injection module 300 by creating a corresponding local form, for example, that matches each well-known remote login form so that the modified login form has the same style of the original login form.

Local command injection module 304 may retrieve a local form corresponding to the remote login form from local command DB 303 and inject the local form into the remote login form to generate a modified login form. In some embodiments, local command injection module 304 may inject local form into the remote login form on the fly. For example, a local user name input and local password input, or a local checkbox may be injected below the remote login form to generate a modified login form. Non-limiting examples of modified login forms are shown in FIGS. 4B and 4C.

FIG. 4A illustrates a remote login form 400 that is transmitted from a remote server to a client in accordance with an embodiment of the present invention. In FIG. 4B, a local login form 410 is injected into the remote login form 400, thereby creating a modified form 420, so that the user may input his/her local credentials, for accessing an account on the network security appliance, in form 410. In this example, the user may input his/her remote credentials in the original inputs (upper half of modified login form 420) and/or input his/her local credentials in the local inputs (lower half of modified login form 420).

It is noted that some remote login forms have self-checking functions before the form submits information to the remote server. For example, a warning message may be presented to the user if any of the username or password input is empty when the login button is clicked. If the user only inputs local credentials into the lower half of the form without inputting his/her remote login credentials, the self-check function of the login form may refuse to submit empty username or password to the remote server. In order to avoid such warning messages, in one embodiment, local command injection module 304 may inject placeholder text into the inputs of the remote login form.

In FIG. 4C, a checkbox 430 is injected into original login form 400 of FIG. 4A to create a modified login form 440 when the user of the destination client is known to the network security appliance. The user may check checkbox 430 to indicate his/her approval for the network security appliance injecting the user's credentials for the remote server into the outgoing traffic sent by the network security appliance to the remote server.

Figure 5:
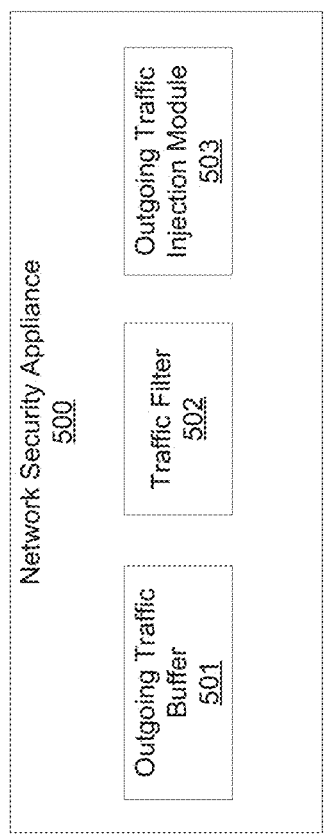
FIG. 5 illustrates exemplary outgoing traffic processing units of a network security appliance in accordance with an embodiment of the present invention.

FIG. 5 illustrates exemplary outgoing traffic processing units of a network security appliance 500 in accordance with an embodiment of the present invention. In the present embodiment, network security appliance 500 may intercept outgoing traffic transmitted from a client within a private network to a remote server and inject appropriate sensitive data of the user into the outgoing traffic so that the sensitive data of the user is transmitted to the remote server without being present at the client side.

In the present embodiment, network security appliance 500 includes an outgoing traffic buffer 501, a traffic filter 502 and an outgoing traffic injection module 503. Outgoing traffic buffer 501 is used for intercepting and buffering outgoing traffic that is transmitted from a client within a private network to a remote server. If the outgoing traffic between the client and the remote server is encrypted, the network security appliance may decrypt it to facilitate injection of the user's sensitive data.

Traffic filter 502 is used for filtering the outgoing traffic based on policies set up by the network administrator. For example, the network administrator may set up a policy that traffic transmitted to banking or online shopping websites may be filtered to inject the user's sensitive data into a form embedded in the outgoing traffic. If traffic passes the traffic filter 502, outgoing traffic injection module 503 extracts a remote command that is to be used by a user to submit sensitive data to the server and injects user's sensitive data into the remote command to generate modified outgoing traffic. The modified outgoing traffic may be encrypted, if necessary, and transmitted to the remote server so that the user's sensitive data may be transmitted to the remote server without being input or presented at the client side. A non-limiting example of the structure and operation of outgoing traffic injection module 503 will be described below with reference to FIG. 6.

Figure 6:
FIG. 6 illustrates exemplary processing units of an outgoing traffic injection module in accordance with an embodiment of the present invention.

FIG. 6 illustrates exemplary processing units of an outgoing traffic injection module 600 in accordance with an embodiment of the present invention. In the present embodiment, outgoing traffic injection module 600 includes a remote command parser 601, a local user identifier 602, a sensitive data database 603 and a remote command injection module 604.

Remote command parser 601 is used for parsing the outgoing traffic and identifying a remote command that is used for submitting information to a remote server. Usually, the remote command that is embedded in the outgoing traffic is a remote login command sent from a client within a private network to a remote server so that a user may submit his/her credentials to the remote server. Those skilled in the art will appreciate that other commands may be embedded in the outgoing traffic. For example, commands that submit other sensitive data, such as personal addresses, social security numbers (SSNs), telephone numbers or credit/debit card information may be transmitted from the client to the remote server. It is noted that commands of protocols other than HTTP may also be parsed by remote command parser 601. For example, login commands associated with File Transfer Protocol (FTP) or the Secure Shell (SSH) protocol may parsed, identified and intercepted by remote command parser 601. Although different websites have different formats of commands for submitting sensitive data from clients to the remote servers, in one embodiment, formats of commands of well-known websites are known to remote command parser 601. When outgoing traffic destined for a well-known website is intercepted, remote command parser 601 may parse commands of the outgoing traffic based on the known formats of the well-known websites and/or commands contained within the well-known web sites.

When no well-known formats/commands are identified, remote command parser 601 may analyze the outgoing traffic on the fly and identify if a login command or other command that may be used for submitting sensitive data is embedded in the outgoing traffic based on some keywords. For example, remote command parser 601 may parse the outgoing traffic and extract a command that is used for submitting information to the remote server. Then remote command parser 601 may check the names of variables of command. If the names of variables contain keywords such as "User Name", "User ID" and "password," for example, remote command parser 601 may conclude that a login command is embedded in the outgoing traffic.

Remote command parser 601 may further parse each variable name contained in the remote command so that corresponding information may be retrieved and injected by the network security appliance.

Local user identifier 602 is used for identifying the local user that is bound with the outgoing traffic. The local user that is sending the command to the remote server may be identified by different ways.

In one embodiment, when a local user logs in the private network that is controlled by the network security appliance, an IP address is bound with the user. Local user identifier 602 may extract the destination IP address of the outgoing traffic and find the user who is binding with the destination IP address.

In another embodiment, if a local login form was injected into the remote login form when the remote login form was transmitted to the client, as shown in FIG. 4B, for example, the user may input his/her local credentials at the local login form. Then the local credentials may be transmitted together with information submitted to the remote server through the outgoing traffic. Local user identifier 602 may parse the user credentials from the outgoing traffic and identify the user based on the local credentials.

In some embodiments, the local user may input his/her local credentials using a modified login form (e.g., local login form 410 of FIG. 4B). In the context of such embodiments, the user's sensitive data may be inserted into the outgoing traffic at the network security appliance without presenting the sensitive data at the client side. Therefore, the modified login form that is presented at the client side may be used for inputting local login credentials that are used to verify access to an account of the user on the network security appliance. The local credentials may be in a special format that can be identified by the network security appliance. For example, a user may input his local user name in a format such as "LocalDomainName/UserName" and his local password directly into the remote login form as shown in FIG. 4A and submit them to the network security appliance through the remote login. As the local user name and local password are embedded in the outgoing traffic, the network security appliance may intercept the outgoing traffic and identify the local user name and local password because the format of the user name is in accordance with a local user name rule.

Sensitive data database 603 is used for storing users' sensitive data at the network security appliance so that no user sensitive data is stored or presented at the client device which is relatively unsafe as compared to a dedicated network security appliance. Sensitive data database 603 may maintain sensitive data of local users as shown in Tables 2 and 3 below so that these data may be injected into the outgoing traffic by the network security appliance.

TABLE 2

| Local User ID | SSN | Credit Card | Address | Tel. | ... |
|---|---|---|---|---|---|
| User1 | xxx-xx-xxxx | xxxx-xxxx-xxxx-xxxx | xxx CA, 94086 | xxx-xxxxxxx | |
| User2 | xxx-xx-xxxx | xxxx-xxxx-xxxx-xxxx | xxx CA, 94086 | xxx-xxxxxxx | |
| ... | ... | ... | ... | ... | |

TABLE 3

| Local User ID | Website | Variable1 | Value1 | Variable2 | Value2 |
|---|---|---|---|---|---|
| User1 | Bank of America | Access_ID | BOA_user1 | Current_Passcode | Password123 |
| User1 | AMAZON | ap_email | u@email.com | ap_password | passwordabc |
| User1 | CITIBANK | username | CITI_USER1 | pwd | Password987 |
| User1 | . . . | | . . . | | . . . |
| User2 | Bank of America | Access_ID | BOA_user1 | Current_Passcode | Password1 |
| User2 | AMAZON | ap_email | A_USER1 | ap_password | Password2 |
| User2 | CITIBANK | username | CITI_USER1 | pwd | Password3 |
| User2 | . . . | | . . . | | . . . |

Remote command injection module 604 may retrieve sensitive data that is required by the remote server from sensitive data database 603 and inject it into remote command to generate a modified outgoing traffic. For example, remote command parser 601 may parse outgoing traffic sent from a client to amazon.com and may identify the existence of a login command embedded in the outgoing traffic. Based on one or more parameters of the traffic, e.g., the destination IP address, remote command parser 601 may identify that the traffic is to be sent to amazon.com. Two variables "ap_email" and "ap_password" may also be identified by remote command parser 601. Local user identifier 602 may identify the local user as "User1" based on the local credentials submitted by the user. Based on the destination ("amazon.com"), local user name ("User1") and the first variable name ("ap_email"), remote command injection module 604 may check sensitive data database 603, such as that represented in Table 4, for example, and retrieve a corresponding value ("u@email.com") which should be submitted to the remote server. Similarly, based on the destination ("amazon.com"), local user name ("User1") and the second variable name ("ap_password"), remote command injection module 604 may check Table 4 and retrieve a corresponding value ("passwordabc") which should be submitted to the remote server. Then, the retrieved values are injected behind the corresponding variable names of the remote command to generate modified outgoing traffic. The modified outgoing traffic may be encrypted, if necessary, and transmitted to the remote server. In the foregoing example, the injection of sensitive data at the network security appliance is transparent to the remote server.

In some embodiments, remote command injection module 604 may further update sensitive data database 603 based on inputs from the user. For example, when the user logs in to the remote server from the private network for the first time, the user may input both remote credentials and local credentials in the modified login form as shown in FIG. 4B. After the outgoing traffic that contain both remote credentials and local credentials are intercepted by the network security appliance, Remote command injection module 604 may modify the outgoing traffic so that only the remote credentials are transmitted to the remote server. Then, remote command injection module 604 may create a new record for the user and the remote server at sensitive data database 603 and store remote credentials at the network security appliance. When the user logs in to the remote server from the private network again, the user may simply input local credentials into the modified login form and need not input the remote input fields again (as they have been learned by and are now stored by the network security appliance). When the outgoing traffic is intercepted by the network security appliance, the corresponding sensitive information (e.g., the required access credentials) may be retrieved from sensitive data database 603 and injected into the outgoing traffic, thereby providing same to the remote server.

It is noted that in some usage scenarios the user may input remote credentials only (and no local credentials may be input into modified login form 420 as shown in FIG. 4B). In such case, the network security appliance may send the outgoing traffic to the remote server without any information injection at the network security appliance side.

In embodiments in which a checkbox (e.g., checkbox 430) is injected into a modified login form (e.g., modified login form 440 as shown in FIG. 4C), if the user checks the checkbox and the user submits remote credentials to the remote server, the network security appliance may transmit the remote credentials to the remote server and store or update the remote credentials within sensitive data database 603. If only the checkbox is checked and no remote credentials are input at the client side, the network security appliance may retrieve appropriate remote credentials of the user for the remote server from sensitive data database 603 and inject them into the outgoing traffic.

Figure 7:
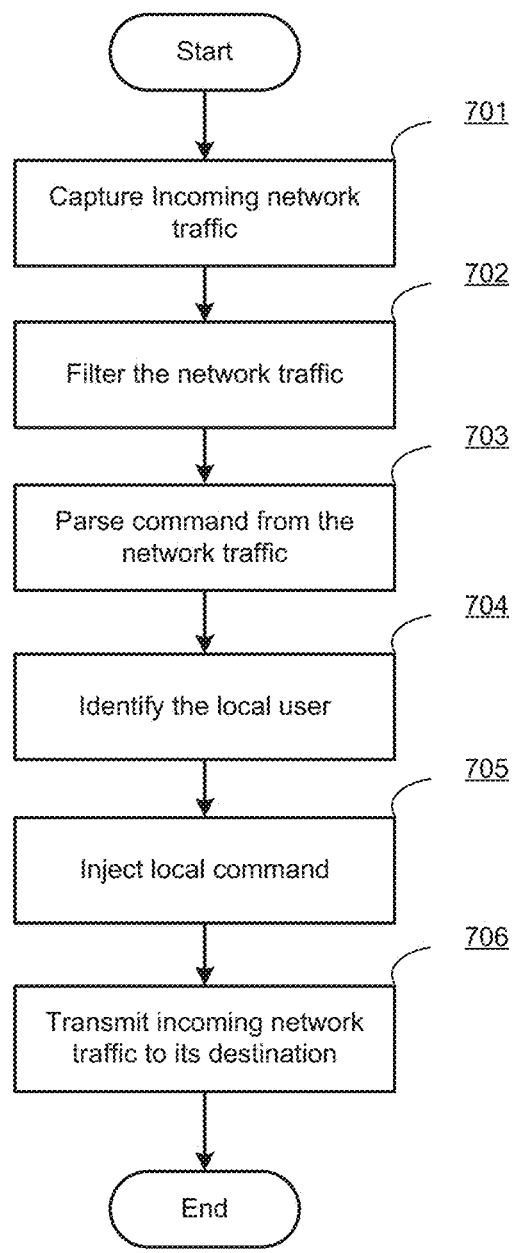
FIG. 7 is a flow diagram illustrating local form injection processing in accordance with an embodiment of the present invention.

FIG. 7 is a flow diagram illustrating local form injection processing in accordance with an embodiment of the present invention. At block 701, a network security appliance captures incoming traffic sent from a remote server to a client within a private network that is controlled by the network security appliance.

At block 702, the captured incoming traffic is filtered based on security policies set up by the administrator of the private network. The incoming traffic may be filtered based on a 5-tuple or other parameters of the incoming traffic so that only traffic from designated websites will be processed. Usually, the incoming traffic that may pass through the filtering is traffic sent from well-known online services that may collect users' sensitive data.

At block 703, the network security appliance may parse the incoming traffic and identify a remote form or command that is embedded within the incoming traffic. When the incoming traffic is transmitted using cryptographic protocols (e.g., Secure Sockets Layer (SSL)), the incoming traffic may be decrypted before it is parsed.

At block 704, the local user associated with the incoming traffic is identified by the network security appliance based on the destination IP address of the incoming traffic.

At block 705, a local form that matches the remote form is injected into the remote form to generate a modified form. The local form may be used to prompt the user for local credentials (e.g., credentials to access the user's account on the network security appliance that stores the user's sensitive data) when the remote form has been identified as one that may be used by the user to submit sensitive data to the remote server. Some text, including placeholder text and/or a local domain name may be injected into input fields of the modified form so that the user may input local credentials without triggering a warning message as discussed above with reference to FIG. 4B.

At block 706, after the local form is injected into the incoming traffic, modified incoming traffic is generated and transmitted to its destination. After the client receives the modified incoming traffic, the modified form embedded in the modified incoming traffic will be presented at the client. The user may then input information required by the remote server and/or local credentials that may be required by the network security appliance into the modified form and submit them to the network security appliance, which in turn submits appropriate form data to the remote server.

Figure 8:
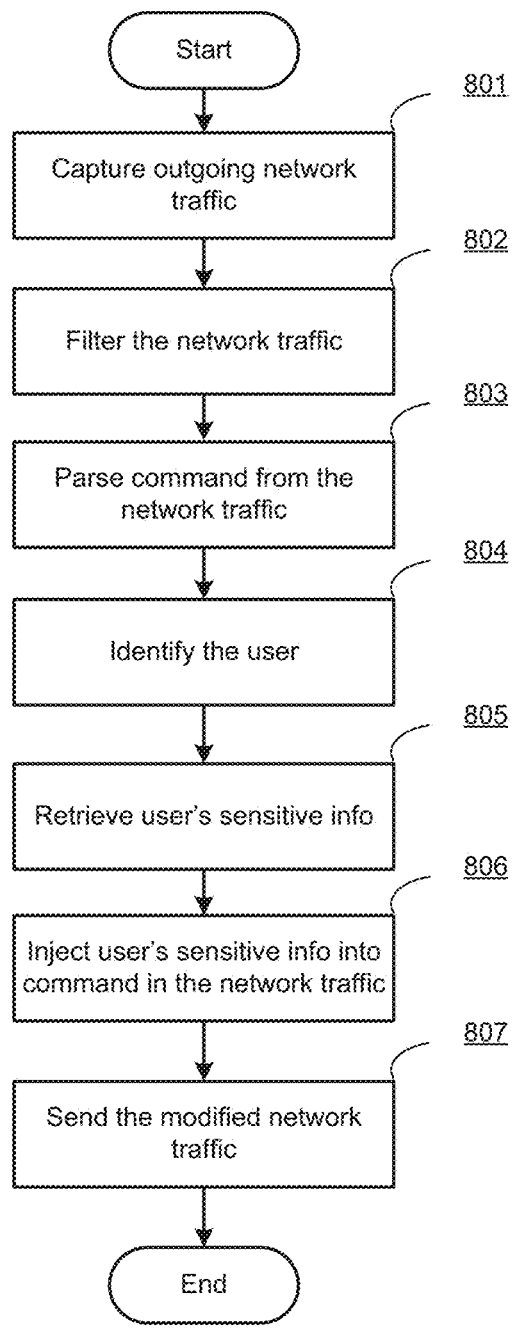
FIG. 8 is a flow diagram illustrating sensitive data injection processing in accordance with an embodiment of the present invention.

FIG. 8 is a flow diagram illustrating sensitive data injection processing in accordance with an embodiment of the present invention. At block 801, a network security appliance captures outgoing traffic destined for a remote server that has been sent from a client within a private network that is controlled by the network security appliance.

At block 802, the captured outgoing traffic is filtered based on security policies set up by the administrator of the private network. The outgoing traffic may be filtered based on a 5-tuple or other parameters of the outgoing traffic so that only traffic sent to designated websites will be processed by the network security appliance. The outgoing traffic configured to pass through the filtering is typically traffic sent to well-known online services that may collect users' sensitive data.

At block 803, the network security appliance parses the outgoing traffic and identifies a remote command that is embedded within the outgoing traffic. When the outgoing traffic is transmitted using cryptographic protocols, such as SSL, the outgoing traffic may be decrypted before it is parsed. The network security appliance may identify one or more predetermined and/or configurable commands and associated variable names and values contained in the form. The variable names and values may include information that is intended for the remote server as well as local credentials that are intended for the network security appliance.

At block 804, the local user associated with the outgoing traffic is identified by the network security appliance. The local user may be identified based on one or more parameters of the outgoing traffic. For example, the local user may be identified based on the source IP address of the outgoing traffic. The local user may also or alternatively be identified based on local credentials submitted to the network security appliance by the user in the outgoing traffic.

At block 805, the network security appliance retrieves appropriate user sensitive data for the remote server from a storage within or coupled to the network security appliance. In one embodiment, the sensitive data may be retrieved from a database that stores sensitive data that has previously been observed as it was transmitted to websites based on information associated with the remote server, the user and variable names.

At block 806, the sensitive data retrieved by the network security appliance may be injected into appropriate fields/positions of the identified remote command to generate modified outgoing traffic.

At block 807, the modified outgoing traffic is transmitted to its destination. In one embodiment, the injection of sensitive data by the network security appliance logically interposed between the client and the remote server is transparent to the remote server. In this manner, the remote server may receive the sensitive data as if it were submitted from the client while the sensitive data is not stored, input or presented at the client side.

Figure 9:
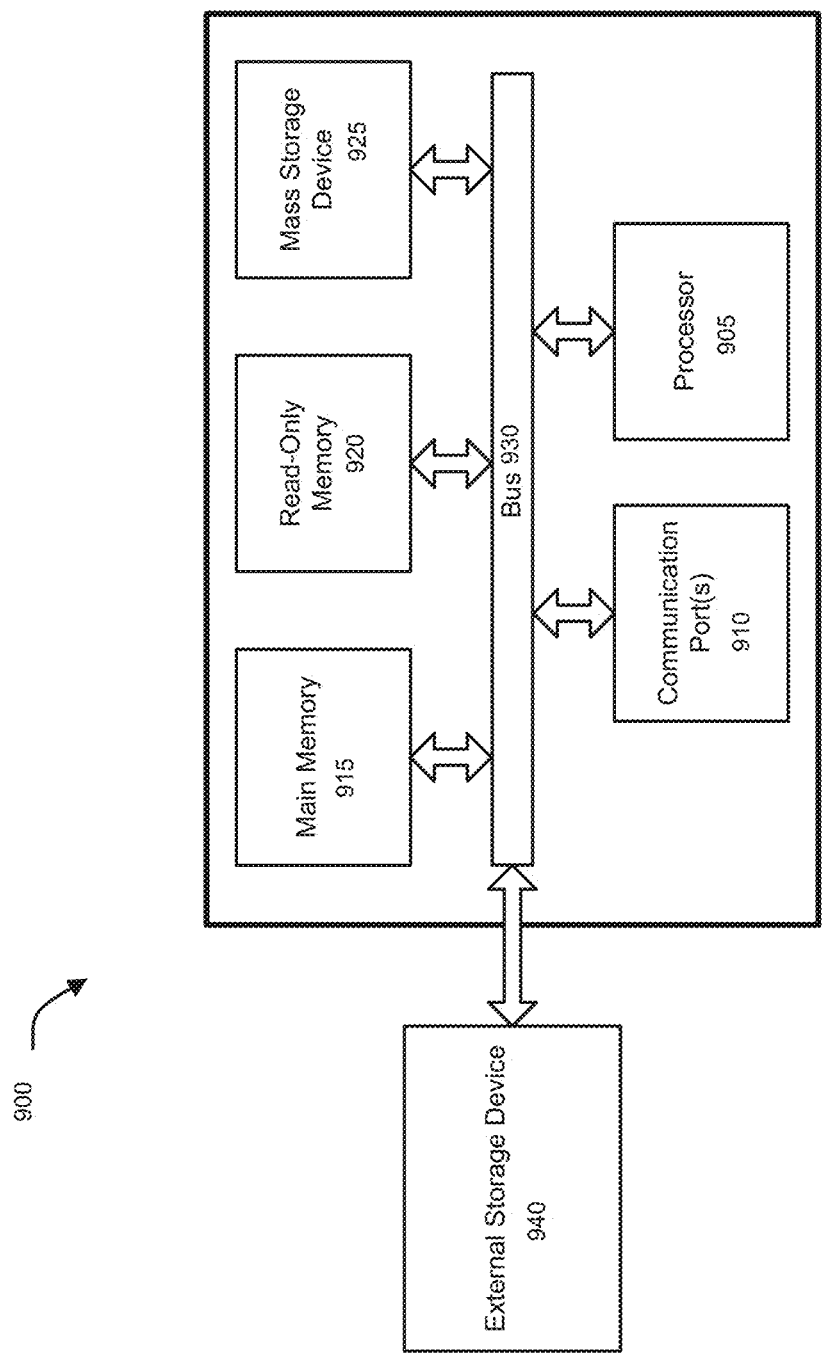
FIG. 9 is an exemplary computer system in which or with which embodiments of the present invention may be utilized.

FIG. 9 is an example of a computer system 900 with which embodiments of the present disclosure may be utilized. Computer system 900 may represent or form a part of a network security appliance (e.g., network security appliance 112, 200 or 500), a server or a client workstation.

Embodiments of the present disclosure include various steps, which have been described in detail above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 900 includes a bus 930, a processor 905, communication port 910, a main memory 915, a removable storage media 940, a read only memory 920 and a mass storage 925. A person skilled in the art will appreciate that computer system 900 may include more than one processor and communication ports.

Examples of processor 905 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 905 may include various modules associated with embodiments of the present invention.

Communication port 910 can be any of an RS-232 port for use with a modem based dialup connection, a 10/100 Ethernet port, a Gigabit or 10 Gigabit port using copper or fiber, a serial port, a parallel port, or other existing or future ports. Communication port 910 may be chosen depending on a network, such a Local Area Network (LAN), Wide Area Network (WAN), or any network to which computer system 900 connects.

Memory 915 can be Random Access Memory (RAM), or any other dynamic storage device commonly known in the art. Read only memory 920 can be any static storage device(s) such as, but not limited to, a Programmable Read Only Memory (PROM) chips for storing static information such as start-up or BIOS instructions for processor 905.

Mass storage 925 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 930 communicatively couples processor(s) 905 with the other memory, storage and communication blocks. Bus 930 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 905 to system memory.

Optionally, operator and administrative interfaces, such as a display, keyboard, and a cursor control device, may also be coupled to bus 930 to support direct operator interaction with computer system 900. Other operator and administrative interfaces can be provided through network connections connected through communication port 910.

Removable storage media 940 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Components described above are meant only to exemplify various possibilities. In no way should the aforementioned exemplary computer system limit the scope of the present disclosure.

While embodiments of the invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

What is claimed is:

1. A method comprising:
   maintaining, by a network security appliance logically interposed between a plurality of local clients associated with a private network protected by the network security appliance and a plurality of remote servers residing outside of the private network, a database of sensitive data of a plurality of users of the private network; and
   facilitating, by the network security appliance, secure submission of sensitive data of a user of the plurality of users in connection with interactions between a local client of the plurality of local clients and a remote server of the plurality of remote servers by:
   intercepting outgoing traffic from the local client to the remote server;
   determining whether the outgoing traffic matches a policy of a plurality of policies configured by an administrator of the private network that causes the network security appliance to inject the sensitive data into the outgoing traffic on behalf of the user; and
   when said determining is affirmative:
   retrieving the sensitive data from the database;
   modifying the outgoing traffic by injecting the sensitive data into the outgoing traffic to form modified outgoing traffic; and
   sending the modified outgoing traffic to the remote server.

2. The method of claim 1, wherein the policy matches outgoing traffic containing a Representational State Transfer (REST)ful Application Programming Interface (API) call or a HyperText Transfer Protocol (HTTP) POST request method associated with a predetermined website.

3. The method of claim 2, wherein the predetermined website comprises a banking or online shopping website.

4. The method of claim 1, further comprising determining, by the network security appliance, an identity of the user.

5. The method of claim 4, wherein said determining, by the network security appliance, an identity of the user comprises identifying the user based on a source Internet Protocol (IP) address contained within the outgoing traffic.

6. The method of claim 4, wherein said determining, by the network security appliance, an identity of the user comprises:
   extracting from the outgoing traffic, by the network security appliance, credential information of the user for accessing the network security appliance; and
   identifying, by the network security appliance, the user based on the credential information.

7. The method of claim 6, wherein the credential information is submitted by the user via a modified version of a server login form sent from the remote server to the local client.

8. The method of claim 6, wherein credential information of the user is submitted by the user via a local login form that was injected by the network security appliance into incoming traffic sent by the remote server to the local client.

9. The method of claim 6, further comprising:
   identifying, by the network security appliance, a server login form contained within incoming traffic sent by the remote server to the local client; and
   modifying, by the network security appliance, the server login form by injecting a prompt for local login credentials into the server login form.

10. The method of claim 1, further comprising:
    causing the user to be prompted by the local client to select a preference in relation to injection of the sensitive data by the network security appliance by injecting information into incoming traffic sent by the remote server to the local client; and
    checking, by the network security appliance, whether the preference selected by the user indicates a desire by the user to have the network security appliance inject the sensitive data by examining the outgoing traffic.

11. The method of claim 1, further comprising:
    maintaining, by the network security appliance, a login form database containing representations of a plurality of login forms of a plurality of well-known websites;
    intercepting, by the network security appliance, incoming traffic from the remote server directed to the local client;
    identifying, by the network security appliance, the incoming traffic as containing a login form of the plurality of login forms;
    modifying, by the network security appliance, the incoming traffic to include a modified login form; and
    sending, by the network security appliance, the modified login form to the local client.

12. The method of claim 1, wherein the sensitive data comprises one or more of user credential information associated with the remote server, a bank card number and a social security number (SSN).

13. A non-transitory computer-readable storage medium embodying a set of instructions, which when executed by one or more processors of a network security appliance protecting a private network, causes the one or more processors to perform a method comprising:
    maintaining a database of sensitive data of a plurality of users of the private network; and
    facilitating secure submission of sensitive data of a user of the plurality of users in connection with interactions between a local client of a plurality of local clients of the private network and a remote server of a plurality of remote servers residing outside of the private network by:
    intercepting outgoing traffic from the local client to the remote server;
    determining whether the outgoing traffic matches a policy of a plurality of policies configured by an administrator of the private network that causes the network security appliance to inject the sensitive data into the outgoing traffic on behalf of the user; and when said determining is affirmative:
retrieving the sensitive data from the database;
modifying the outgoing traffic by injecting the sensitive data into the outgoing traffic to form modified outgoing traffic; and
sending the modified outgoing traffic to the remote server.

14. The non-transitory computer-readable storage medium of claim 13, wherein the policy matches outgoing traffic containing a Representational State Transfer (REST) ful Application Programming Interface (API) call or a HyperText Transfer Protocol (HTTP) POST request method associated with a predetermined website.

15. The non-transitory computer-readable storage medium of claim 14, wherein the predetermined website comprises a banking or online shopping website.

16. The non-transitory computer-readable storage medium of claim 13, wherein the method further comprises determining an identity of the user.

17. The non-transitory computer-readable storage medium of claim 16, wherein said determining an identity of the user comprises identifying the user based on a source Internet Protocol (IP) address contained within the outgoing traffic.

18. The non-transitory computer-readable storage medium of claim 16, wherein said determining an identity of the user comprises:
extracting from the outgoing traffic credential information of the user for accessing the network security appliance; and
identifying the user based on the credential information.

19. The non-transitory computer-readable storage medium of claim 18, wherein credential information of the user is submitted by the user via a local login form that was injected by the network security appliance into incoming traffic sent by the remote server to the local client.

20. The non-transitory computer-readable storage medium of claim 13, wherein the sensitive data comprises one or more of user credential information associated with the remote server, a bank card number and a social security number (SSN).

* * * * *